United States Patent [19]
Jorgensen et al.

[11] Patent Number: 5,480,271
[45] Date of Patent: Jan. 2, 1996

[54] ADJUSTABLE DIE HEAD

[75] Inventors: Glenn F. Jorgensen, Ridgewood, N.J.; Michael W. Kelly, Joliet, Ill.

[73] Assignees: Power House Tool, Inc., Joliet, Ill.; JNT Technical Services, Inc., Little Ferry, N.J.

[21] Appl. No.: 242,237

[22] Filed: May 13, 1994

[51] Int. Cl.$^6$ .................................................. B23G 5/10
[52] U.S. Cl. .................... 408/184; 408/221; 408/713; 470/190
[58] Field of Search ................. 408/215–222, 408/181, 184, 185, 231–233, 713; 470/187–190

[56] References Cited

U.S. PATENT DOCUMENTS

| | | |
|---|---|---|
| 2,864,102 | 12/1958 | Budnick . |
| 3,812,547 | 5/1974 | Reich . |
| 4,531,863 | 7/1985 | Smith ........................................ 407/113 |
| 5,112,162 | 5/1992 | Hartford et al. ........................... 407/41 |

Primary Examiner—Steven C. Bishop
Attorney, Agent, or Firm—Hill, Steadman & Simpson

[57] ABSTRACT

An adjustable die assembly having a ring structure with a clear central aperture for locating the ring structure along an axial length of a rod to have threads repaired or cut, and having a plurality of thread cutting chaser inserts connected to tool blocks which are slidable radially on said ring, each tool block connected to a threaded adjustment shaft, threaded into said ring for adjusting the radial position of each chaser insert. Alternatively, each threaded adjustment rod can be provided with a pinion gear, and a rim gear can be in mesh with each pinion gear, and a gear device can be provided for turning the rim gear to simultaneously adjust all chasers radially.

17 Claims, 3 Drawing Sheets

ADJUSTABLE DIE HEAD

BACKGROUND OF THE INVENTION

The present invention relates to milling tools, in particular a thread die for forming or reforming threads on a threaded stud. Dies for rethreading or initially threading studs or rods are typically annularly shaped, having intermittent regions of thread cutting teeth or chasers applied on an inside diameter of the die, radially facing the threads to be cut. The annular ring is placed on the stud or rod and turned with force which allows the chasers to cut or recut threads on the stud or rod. One problem with non-adjustable dies is that in order to repair damaged threads which are located in a central region of a threaded stud, the die must be threaded down through the stud from a free end thereof to reach the central region. This is time consuming especially when repairing large diameter studs in industrial applications. This is of particular concern in nuclear power facilities where workers are often allowed access to areas needing repair for only very limited time periods due to radiation levels present at those work areas.

A known die head for cutting threads is disclosed in U.S. Pat. No. 2,864,102. In this patent, the die head eliminates the requirement of removal of the die head from the die holder in order to exchange chasers. A longitudinal cylindrical die body is provided with longitudinally extending recesses around its outer periphery in which individual chasers are clamped. A removable sleeve is provided which by camming action, locks the chasers into the die body recesses for performing a cutting operation. A radial adjustment is not provided.

SUMMARY OF THE INVENTION

It is an object of the present invention to provide an adjustable thread cutting or repairing die which can be applied to a stud at a position on the stud without having to thread the die from a free end of the stud to the damaged region. It is an object of the present invention to provide an adjustable die which can be applied to studs of differing diameters. It is an object of the present invention to provide an adjustable die which can receive replaceable chaser inserts of a selected thread pitch and which is adaptable to conform to a wide variety of stud diameters. It is an object of the present invention to provide an easily adjusted die tool wherein a single adjustment sets the radial position of a plurality of chasers.

The objects of the invention are achieved in that an adjustable die tool is provided which is annular in shape having a central open area of a greater diameter than the major diameter of a stud to be repaired and which has radially inwardly directed chasers which can be retracted or progressed in the radial direction to allow passing of the major diameter of this stud until a damaged area is reached and whose chasers can then be adjusted inward radially to engage with the threads for repair. The invention provides a base ring having threaded holes for receiving adjusting screws. The adjusting screws are engaged for axial movement with tool blocks which hold chaser inserts. The tool blocks slide within passages of the base ring upon threading of the screws. The tool blocks provide an axially elongate slot for receiving the chaser inserts, one at each block, and a set screw arrangement for holding the chaser inserts in place. The chaser inserts are readily replaceable when dulled or when a different thread pitch is desired. Connected to the base ring is a cover plate which retains the tool blocks for axial movement only with regard to the base ring.

In an alternate embodiment a gear arrangement is provided such that by turning a single hand wheel, a plurality of radially spaced apart chasers can be adjusted equally and with precision to engage the diameter of a stud to be cut or repaired. This gear arrangement provides a rim gear encircling the base ring and having circumferentially arranged teeth engaging a plurality of pinion gears, each attached axially to the adjusting screws. A drive gear is engaged to the teeth of the rim gear, and when cranked by the hand wheel, instigates turning of all of the adjusting screws simultaneously.

DETAILED DESCRIPTION OF THE PREFERRED EMBODIMENTS

Figure 1:
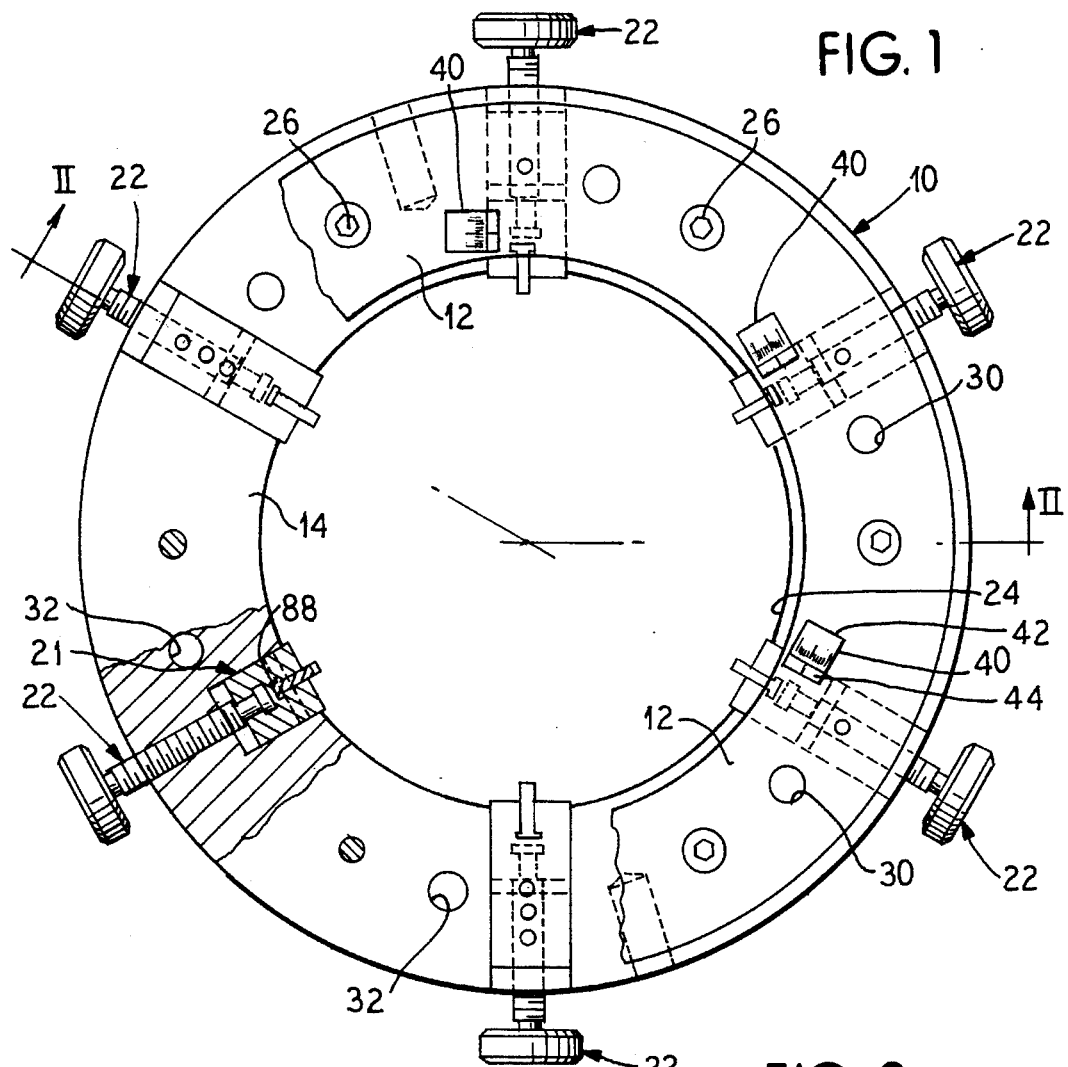
FIG. 1 is a plan view of a die assembly of the present invention with portions of a top cover removed for clarity.

FIG. 1 illustrates a die assembly 10. This assembly comprises a cover plate 12 below which is arranged a base ring 14. Through the base ring 14 are arranged L-shaped slots 16 which have a horizontal leg 18 and a vertical leg 20 when viewed in the orientation of FIG. 2. Arranged between the cover 12 and the base ring 14 and partially slidable within the slots 16 are adjustable chaser assemblies 21. In the embodiment described, there are six assemblies 21, although other numbers are also encompassed by the present invention. The assemblies 21 are adjusted by screw adjusters 22.

The base ring 14 defines a circular opening 24 through which a stud to be cut or repaired is placed. The cover 12 is attached to base ring 14 by a plurality of spaced apart cap screws 26. Spaced apart on the cover 12 are apertures 30 which register with apertures 32 in the basel ring. These apertures are for engagement by a spanner wrench 36 described in FIGS. 9 and 10. At each assembly 21 a window is formed through the cover 12. Below the window 40 graduation marks 42 are applied onto the base ring 14 and a location mark 44 is applied to the tool block held within the slot 16. The location of the locating mark 44 with respect to the graduations 42 can precisely radially set each screw adjuster 22.

Figure 2:
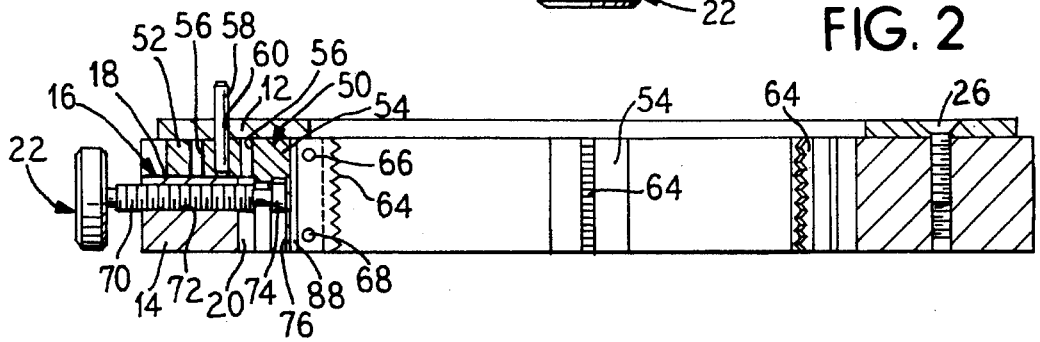
FIG. 2 is a sectional view taken generally along line 2—2 of FIG. 1.

FIG. 2 illustrates the structure of the screw adjuster 22 and assembly 21 located within the L-shaped slot 16. Protruding radially inwardly of the base ring 14 is a tool block 50. The tool block provides a tail piece 52 located within the horizontal leg 18 of the slot and a head piece 54 connected to the tail piece 52 and arranged radially inwardly therefrom within the horizontal leg 20 of the L-shaped slot 16. The tail piece provides a plurality of holes 56, a selected one of which can receive a pin 58 which is also received into a hole 60 of the cover 12. The pin 58 thus can fix a radial position of the tool block 50 with respect to the cover 12. The head piece 54 mounts a chaser insert 64 thereto by two set screws or pins 66, 68.

Figure 8:
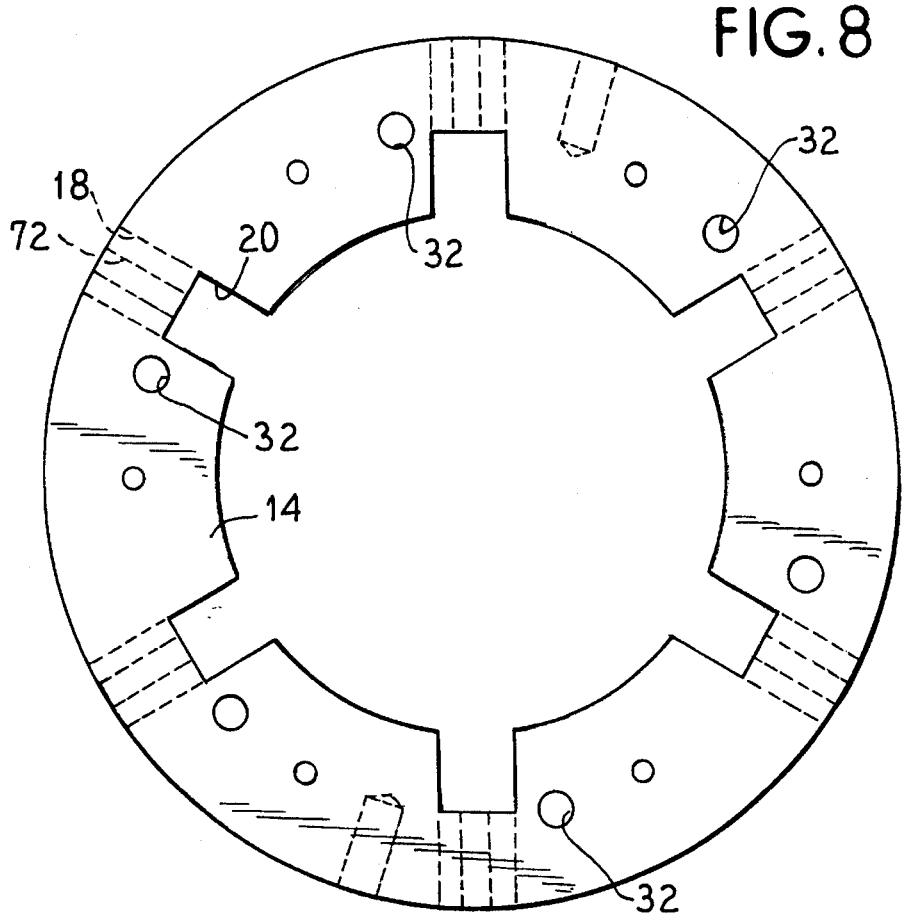
FIG. 8 is a bottom plan view of a base ring from FIG. 1.

Referring to FIGS. 2 and 8, a threaded shaft 70 of the screw adjuster 22 is threaded into a threaded bore 72 of the base ring 14. The threaded shaft 70 terminates in a disc shaped head 74 which is captured within a slot 76 of the head piece 54. The disc shaped head 74 can axially rotate within the slot 76 but is captured for axial translatory movement with respect thereto. Therefore, turning of the threaded shaft 70 progresses the head 74 and thus the tool block 50 (provided the pin 58 is removed) in one radial direction or the other.

Figure 3:
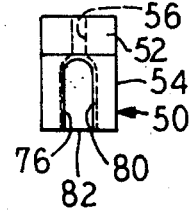
FIG. 3 is a left side view of a tool block of the present invention.
Figure 4:
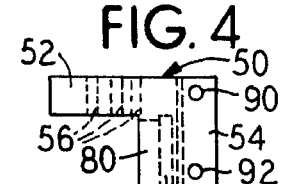
FIG. 4 is an elevational view of the tool block of FIG. 3.
Figures 5, 7:
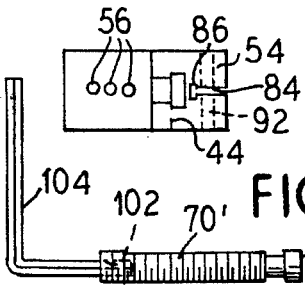
FIG. 5 is a bottom view of the tool block of FIG. 4.
FIG. 7 is an alternate embodiment of the screw adjuster of the FIG. 6.

FIGS. 3–5 illustrate the tool block 50 in more detail. The slot 76 has a surrounding lip 80 which prevents axial retraction of the head 74 out of the slot 76. The head 74 is captured by the slot 76 through a bottom open end 82. In other words, with the cover 12 removed from the base ring 14, the tool block 50 is connected to the threaded shaft 70 by downward placement of the tool block onto the head 74. Replacing the cover 12 onto the base ring 14 thereby captures the tool block onto the threaded shaft head 74.

The head piece 54 provides a chaser slot 84 having an enlarged back region 86. Chaser inserts 64 are formed with a rearward flange 88 as shown in FIGS. 1 and 2, which closely interfits within the back region 86 to hold the chaser insert firmly against any radial movement. The pins or set screws 66, 68 can be installed in through bores 90, 92. The chaser 64 can have through holes which register with the through bores 90, 92 such that a pin can penetrate entirely therethrough.

Figure 6:
FIG. 6 is an elevational view of a screw adjuster of the present invention.

FIG. 6 shows the threaded shaft 70 terminating on an outside of the base ring 14 with a turning knob 100. Alternatively, FIG. 7 shows a threaded shaft 70' having a hex socket 102 for receiving an allen wrench 104 for adjusting.

In practice, when six screw adjusters 22 are used, three of the adjusters can be preset at the desired radial distance for the stud or rod to be engaged, with the remaining three backed radially outward to provide the assembly of the die assembly 10 onto the stud or rod. Only these three adjusters 22 need be tightened or loosened to engage and disengage the die assembly and the stud or rod. A similar procedure applies when other numbers of screw adjusters are provided on the die assembly.

Figure 9:
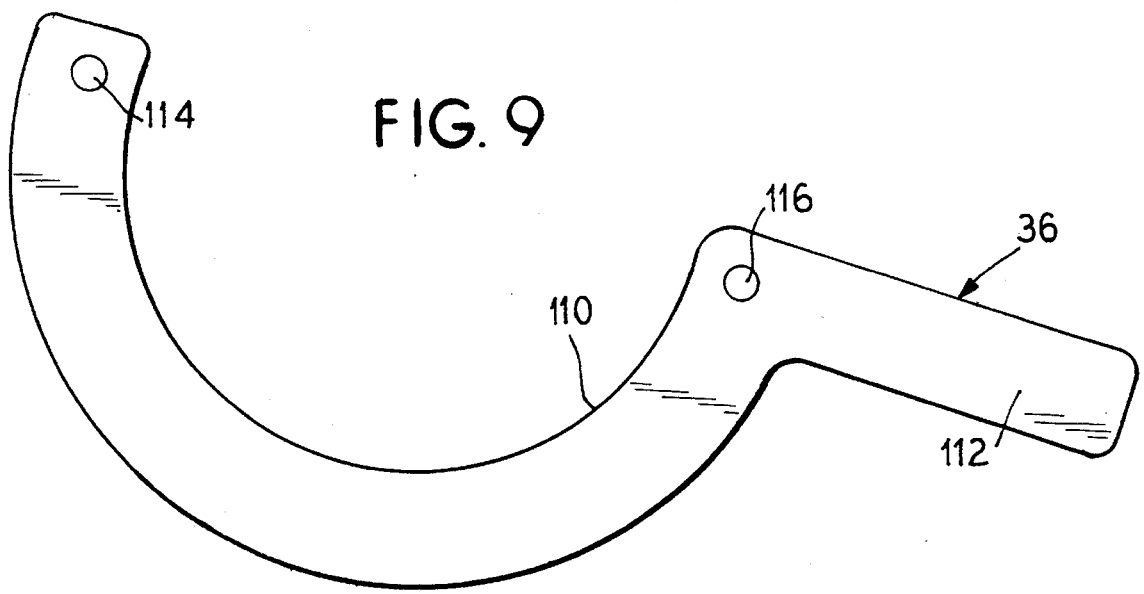
FIG. 9 is a plan view of a spanner wrench for use with the die assembly of FIG. 1.
Figure 10:
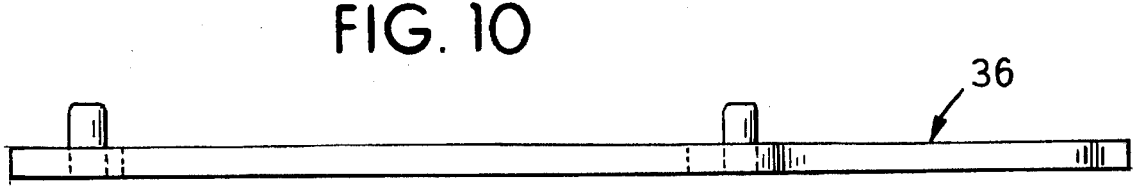
FIG. 10 is an elevational view of the spanner wrench shown in FIG. 9.

FIGS. 9 and 10 illustrate the spanner wrench 36 of the present invention. The wrench provides an arcuate section 110 which has a diameter to allow clearance for the stud being threaded or repaired. The spanner has a handle 112 connected to the arcuate section 110. Two dowels 114, 116 are provided which are spaced apart such as to register with apertures 32 or 30, either from a cover side of the assembly 10 or from a bottom side of the assembly 10, depending on working clearances. Once registered, the spanner can be turned with force to cut or repair threads.

Figure 11:
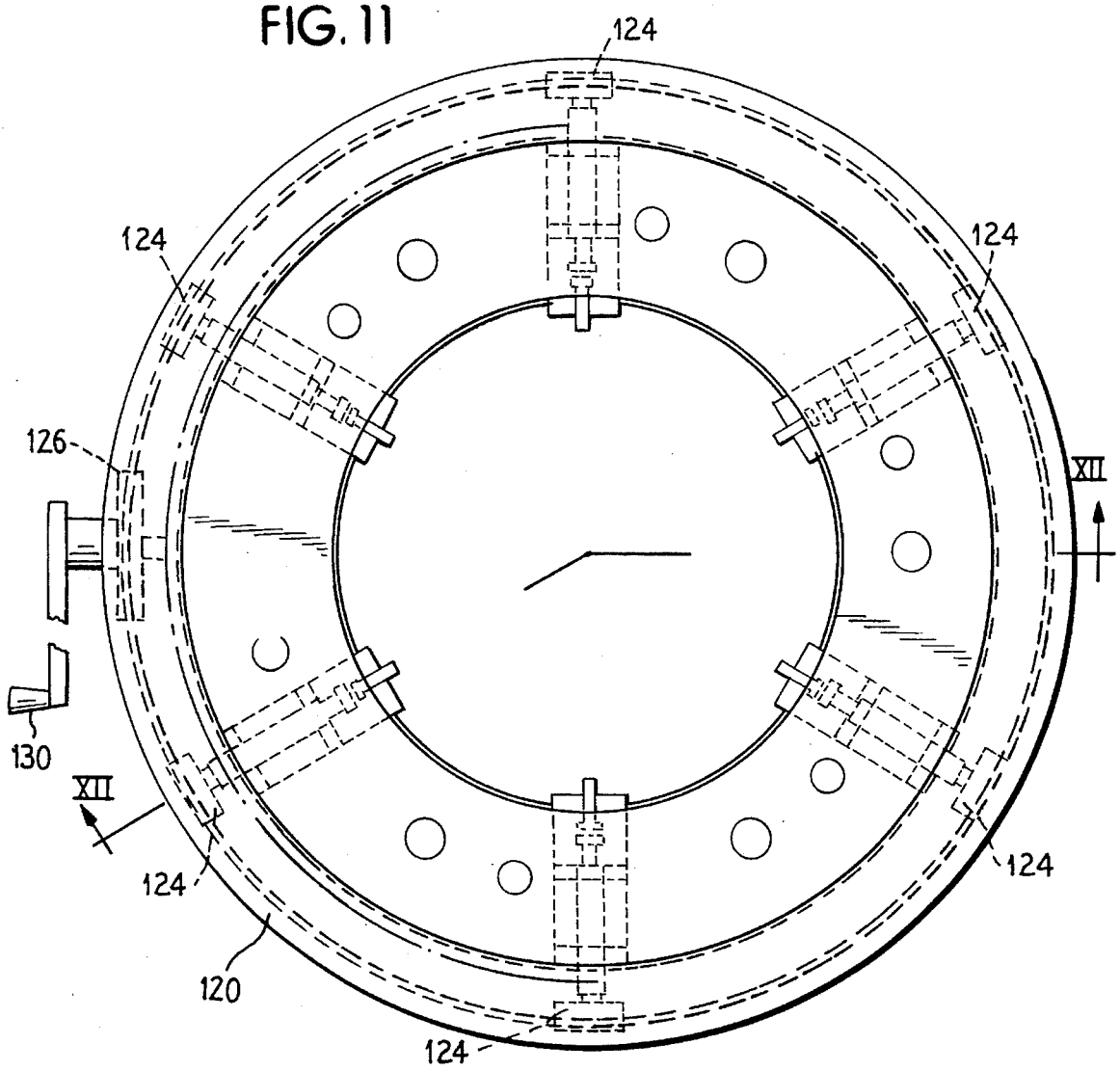
FIG. 11 is a plan view of an alternate embodiment die assembly.
Figure 12:
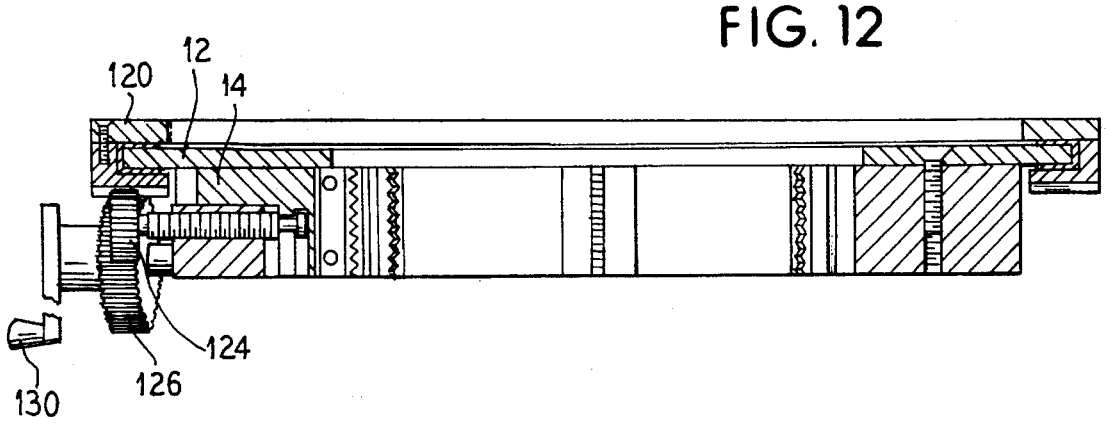
FIG. 12 is a sectional view taken generally along line XII—XII from FIG. 11.

FIG. 11 illustrates an alternate embodiment of the present invention which further simplifies the adjustment of screw adjusters 22'. According to this embodiment, a separate adjustment of individual adjusters 22' is not required. A rim gear 120 is applied around an outer circumference of the base ring 14 and cover 12. Each adjuster 22' comprises a pinion gear 124 in mesh with the rim gear 120. Upon the rotation of the rim gear, each pinion gear 124 will rotate in an identical number of rotations. A drive pinion gear 126 having a crank handle 130 is in mesh with the rim gear such that turning of the drive pinion gear 126 by an operator rotates the rim gear. Thus, an equal and precise adjustment of all screw adjusters 22' is achieved.

As is apparent from the foregoing specification, the invention is susceptible of being embodied with various alternations and modifications which may differ particularly from those that have been described in the preceding specification and description. It should be understood that we wish to embody within the scope of the patent warranted hereon all such modifications as reasonably and properly come within the scope of our contribution to the art.

We claim as our invention:

1. A die assembly for cutting threads around a rod, comprising:

a frame means for encircling the rod and for being rotated by an operator;

a plurality of thread cutting chasers mounted to said frame means having a freedom of movement in a radial direction toward and away from said rod;

means allocated at each of said chasers for selectively radially positioning said chasers; and pin means for locking said chasers at predetermined radial positions corresponding to thread diameters to be cut.

2. The die assembly according to claim 1 wherein said frame means comprises a ring and said means for radially positioning said chasers comprises a threaded rod connected at one end to said chaser and threaded through a threaded bore of said ring.

3. A die assembly for cutting threads around a rod, comprising:

a frame means for encircling the rod and for being rotated by an operator;

a plurality of thread cutting chasers mounted to said frame means having a freedom of movement in a radial direction toward and away from said rod; and means allocated at each of said chasers for selectively radially positioning said chasers;

wherein each of said chasers comprises a thread cutting chaser insert, and a tool block, said thread cutting chaser insert being fastened to said tool block; and said frame comprises a radially orientated tool block slot and said tool block partially resides within said tool block slot to slide with respect thereto, said means for positioning being connected to each said tool block.

4. The die assembly according to claim 3 wherein said means for positioning comprises a threaded rod engaged into a threaded bore in said frame means and having a head portion captured within an assembly slot formed in said tool block.

5. The die assembly according to claim 4 wherein said frame means comprises a base ring and a cover ring removable therefrom, said cover ring closing said tool block slot to partially capture said tool block within said slot.

6. The die assembly according to claim 5 wherein said tool block comprises an L-shape having a tail piece captured within said assembly slot and a head piece proceeding radially therefrom and having a said slot formed therein for capturing said head portion of said threaded shaft, said slot having an axial open face opposite said cover ring, said tool block adapted to be installed onto said head portion with said cover ring removed and captured thereon upon installation of said cover ring.

7. A die assembly for cutting threads around a rod, comprising:

a frame means for encircling the rod and for being rotated by an operator;

a plurality of thread cutting chasers mounted to said frame means having a freedom of movement in a radial direction toward and away from said rod; and means allocated at each of said chasers for selectively radially positioning said chasers; and wherein said means for radially positioning comprises a rim gear, and each chaser has associated therewith a threaded rod, threaded through a bore in said frame means and connected at one end to said chaser with an opposite end having a pinion gear allocated thereon, said pinion gears being in mesh with said rim gear such that turning of said rim gear turns all said pinion gears an equal amount.

8. The die assembly according to claim 7 further comprising a drive pinion gear in mesh with said rim gear and having a crank handle fixed thereto for turning said drive pinion gear.

9. A die assembly for cutting threads around a rod, comprising:

a frame means for encircling the rod and for being rotated by an operator;

a plurality of thread cutting chasers mounted to said frame means having a freedom of movement in a radial direction toward and away from said rod; and means allocated at each of said chasers for selectively radially positioning said chasers; and further comprising a locator mark applied to each said chaser and a graduated scale applied to said frame means adjacent said locator mark.

10. A die assembly for cutting threads around a rod, comprising:

a frame means for encircling the rod and for being rotated by an operator;

a plurality of thread cutting chasers mounted to said frame means having a freedom of movement in a radial direction toward and away from said rod; and means allocated at each of said chasers for selectively radially positioning said chasers; and wherein each said chaser comprises a thread cutting chaser insert and a tool block connected thereto, said tool bock radially slidable with respect to said frame means to position said chaser insert, said tool block comprises a plurality of holes aligned in a radial direction and said frame means comprises a stop pin insertable into a selected one of said holes to fix a radial position of said tool block.

11. A die assembly for cutting threads around a rod, comprising:

a ring for surrounding the rod, said ring having a plurality of guide means arranged radially thereon;

a plurality of tool blocks mounted slideably on said ring and guided for radial movement by said guide means, said tool blocks spaced angularly apart on said ring;

a plurality of thread cutting chaser inserts having thread cutting teeth arranged thereon for contact with said rod, one insert mounted on each tool block; and means for adjusting the radial position of each said tool block to correspond to the diameter of the rod.

12. The die assembly according to claim 11 wherein said guide means comprises slots formed in said ring, having open axial tops for insertion of said tool blocks therein;

and further comprising a cover for closing said axial open tops to capture said tool blocks therein.

13. The die assembly according to claim 11 wherein said means for adjusting comprises a plurality of thread means, one for sliding each tool block upon application of an external turning torque.

14. The die assembly according to claim 13 wherein said thread means comprises a threaded rod engaged into a threaded bore of said ring and said threaded rod connected to one tool block for radial movement therewith but free to axially rotate with respect thereto.

15. The die assembly according to claim 13 wherein said means for adjusting comprises a gear allocated to each threaded means, and a gear means connected to said gears for receiving said external turning torque and turning said gears equally.

16. A method of cutting thread in a rod comprising the steps of:

providing a frame having a central open region allowing the rod to be placed therethrough to position the frame axially on said rod;

providing on said frame radially inwardly directed thread cutting chasers;

providing a means for radially adjusting the position of said thread cutting chasers with respect to said frame;

axially locating said frame to a position of said rod where threads are to be cut;

adjusting the radial position of said thread cutting chasers to preselected radial positions and inserting pins to lock said chasers at said radial positions to engage the area of said rod where threads are to be cut; and using force turning said frame about the axis of said rod to cut threads.

17. The method of cutting thread in a rod comprising the steps of:

providing a frame having a central open region allowing the rod to be placed therethrough to position the frame axially on said rod;

providing on said frame radially inwardly directed thread cutting chasers;

providing a means for radially adjusting the position of said thread cutting chasers with respect to said frame;

axially locating said frame to a position of said rod where threads are to be cut;

adjusting the radial position of said thread cutting chasers to engage the area of said rod where threads are to be cut;

using force turning said frame about the axis of said rod to cut threads;

providing a means of adjusting all of said chasers simultaneously by turning one actuator; and turning said actuator to radially project inwardly said thread cutting chasers to engage said rod, wherein said means of radially adjusting comprises screw adjusters for radially positioning said chasers; and said means of adjusting all of said chasers comprises a gear means for mechanically connecting said actuator with said screw adjusters to axially turn each of said screw adjusters.

* * * * *